Dec. 17, 1929.  F. SPILL  1,739,696
METHOD AND APPARATUS FOR MANUFACTURING FRAMES FOR SUNGLASSES AND THE LIKE
Filed Jan. 21, 1928
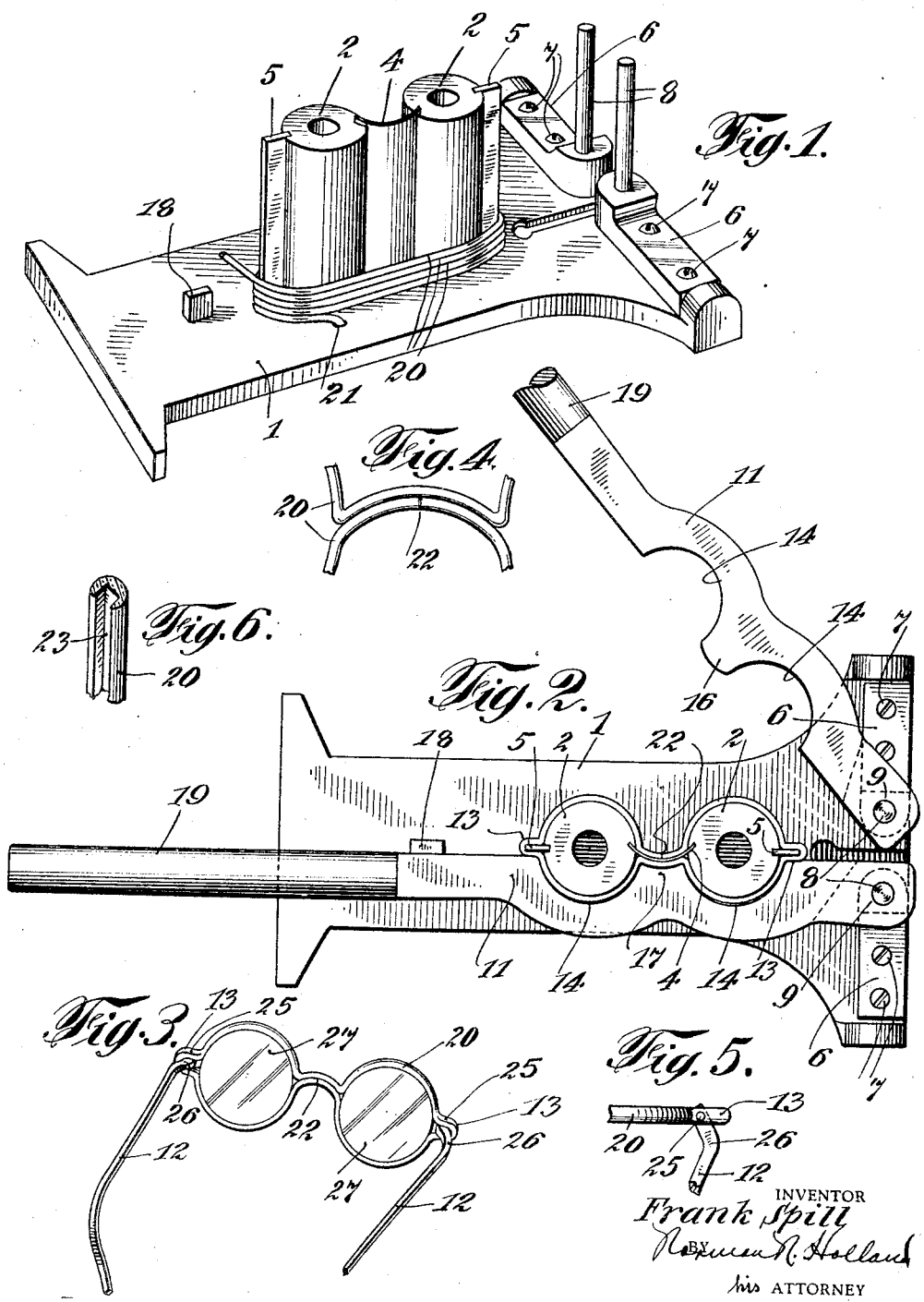
INVENTOR
Frank Spill
BY
his ATTORNEY Patented Dec. 17, 1929

1,739,696

UNITED STATES PATENT OFFICE

FRANK SPILL, OF EAST RUTHERFORD, NEW JERSEY, ASSIGNOR TO THE SPILL MANUFACTURING CO., INC., OF EAST RUTHERFORD, NEW JERSEY, A CORPORATION OF NEW JERSEY

METHOD AND APPARATUS FOR MANUFACTURING FRAMES FOR SUNGLASSES AND THE LIKE

Application filed January 21, 1928. Serial No. 248,354.

The present invention relates to spectacles or goggles sometimes known as sun-glasses and more particularly to a method and apparatus for manufacturing the less expensive types of these articles.

Such glasses are not ordinarily used for correcting defective vision but are provided with lenses of colored or clear glass which prevent impairment of vision and strain upon the eyes caused by dust by the glare of the sun or from the headlights of automobiles and the like. Large quantities of such glasses are sold and competition is very keen. Certain types of the completed glasses with colored lenses may be purchased at ten cent stores.

It is therefore important, in order to be able to sell the articles at such prices, to keep the manufacturing cost as low as possible. At the same time the public demands that they be neat in appearance and sufficiently strong and durable to withstand the rough usage to which they are subjected.

In the manufacture of such glasses it has been customary for skilled workmen to shape individual forms from short rods of celluloid, the free ends of the rods projecting laterally from the ends of the frame and when attached together hold the frame in shape. Considerable labor is required to heat and shape the frames and there is waste of material occasioned by the severance of the laterally projecting ends of the rods.

An object of the present invention is to provide a method and apparatus for manufacturing goggles or sun-glasses which reduce materially the cost of the articles and improve their appearance.

Another object of the invention is to increase the speed of manufacturing sunglasses and to maintain uniformity in the finished articles.

A further object of the invention is to provide an apparatus for manufacturing sunglasses and for practicing the method herein, which is simple and inexpensive in construction and adapted to be manufactured from readily obtainable material.

Other and further objects of the invention will be apparent from an understanding of the illustrated embodiment about to be described, and various advantages not referred to herein will occur to one skilled in the art upon employment of the invention in practice.

A preferred embodiment has been chosen for purposes of illustration and description and is shown in the accompanying drawings, wherein Fig. 1 is a perspective view of the base member of a preferred form of apparatus;

Fig. 2 is a top plan view of the apparatus with one of the matrix members in open position;

Fig. 3 is a preferred form of the completed article;

Fig. 4 is a detailed view of the juncture of the free ends of the frame;

Fig. 5 is a detailed view of the attachment of a templet; and

Fig. 6 is a detailed view of the preferred form of celluloid rod used with the present method and apparatus.

Described generally, the present method contemplates the manufacture of a number of frames for sun-glasses in a single operation thereby reducing the time and labor required to a minimum, and maintaining uniformity in the finished articles. The method may be practiced by providing a long rod of celluloid or the like having a groove in one side thereof adapted to accommodate the peripheral edge of the lenses. This rod is bent to form a series of coils elliptical in form, positioned one above the other. The diametric sides of the coils, adjacent the minor axis thereof, are pressed together and shaped to form the bridge parts of the frames, the ends of the ellipse being reduced in size to form the circular frames for the lenses.

The entire series of frames are integral with each other. To separate them, the frames are cut on the lower side of the bridge to form completed frames. Each free end formed by the cutting is joined to its complementary end. In other words, the end leading to the adjacent upper frame is joined with the end leading from the adjacent lower frame. The juncture is made by adhesive or solvent which preferably makes an integral joint. This joint is formed on the under side of the bridge substantially to conceal the same.

The preferred form of apparatus, which may be used in practicing the method herein, comprises a base member 1 having a pair of upright substantially cylindrical members 2 joined by a relatively thin bridge 4. Diametrically opposite the ends of the bridge, on the members 2, are a pair of laterally projecting members 5 adapted to form the eyelets 13 on the ends of the frame for receiving suitable templets 12. At one end of the base member 1 is a pair of members 6 secured to the base by screws 7 with upright pins 8 mounted at their inner ends.

The pins 8 are adapted to fit in bearings 9 to pivot a pair of matrix members 11. These members each have a pair of recesses 14 substantially semi-cylindrical in shape adapted to envelop in spaced relation the upright members 2 on the base to form with said members a suitable matrix for a series of frames as shown in Fig. 2. Intermediate the recesses 14 are rounded projections 16 and 17 which co-operate with the part 4 to form respectively the lower and upper parts of the bridge for the frames. The laterally projecting members 5 form the eyelets 13 for pivoting the ends of the templets thereto. A suitable stop or spacing member 18 is adapted to space the members 11 with respect to the upright members 2 and suitable handles 19 facilitate manipulation of the device.

In operation a continuous rod 20 of celluloid or the like having a suitable groove on one side adapted to accommodate the periphery of a lens is secured at one end in an aperture 21 of the base and then wrapped about the upright members 2 as shown in Fig. 1 to form a series of substantially elliptical coils one above the other. The groove 23 of the rod faces the upright members 2 or the center of the coil so that it will be in proper position to receive the lenses when the frame is completed. If desirable the rod may be heated to facilitate bending into the form shown in Fig. 1. These operations are performed while the members 11 are in open position; thereafter the entire apparatus is submerged in warm water which softens the celluloid rod whereupon the members 11 are closed to press the coils into the form shown in Fig. 2 without damage thereto. The device is then removed from the warm water and submerged in cold water to set the celluloid in its molded position.

The coil has now been formed into a series of frames integral with each other. These are severed as shown at 22 at the lower side of the bridge. The frames are then removed and a suitable solvent or adhesive utilized for joining the proper ends of the coils. Suitable templets 12 may be pivoted to the eyelets 13 on the ends of the frame by means of the rivets 25 as shown in Figs. 2 and 5. The ends of the templets are curved as shown at 26 to act as stops to limit the outward movement thereof. Suitable lenses 27 may be nested into the frame and seated in the groove 23 either before or after the ends of the rod are cemented together.

It will be seen that the present method may be practiced by an apparatus which is simple in construction and operation and which may be manufactured from readily obtainable parts; by means of it a series of frames may be manufactured with the same degree of ease as a single frame heretofore, thereby greatly decreasing the time and labor required. The different frames may be made in the same matrix and at the same time, and are therefore uniform in construction and appearance. The finished articles are neat in appearance and fully capable of withstanding the rough usage to which they may be subjected. They are by no means temporary glasses which need frequent replacement.

As various changes may be made in the above embodiment without departing from the spirit of the invention, it is to be understood that all matter herein is to be interpreted as illustrative and not in a limiting sense.

Having thus described my invention, I claim:

1. In a device of the class described, the combination of a frame having a pair of members thereon, and means for setting a rod coiled about said members to cause it to conform thereto, thereby providing a plurality of frames for spectacles.

2. In a device of the class described, the combination of a base member, a pair of members thereon, said members being spaced from each other, an arched bridge connecting said members, and laterally extending means on said members substantially in line with the sides of said arched bridge.

3. The method of making frames for spectacles and the like, which method comprises bending a continuous rod into a series of loops, pressing the central parts of the loops together to form bridges, retaining the portions of said loops on the respective sides of the bridges in the form of lense frames, and severing said loops to provide separate frames for spectacles.

4. The method of making frames for spectacles and the like, which method comprises wrapping a rod helically about a form to provide a series of elongated loops, pressing the sides of said loops together to form bridges, severing said loops at the bridges to form a plurality of frames for spectacles.

5. The method of making frames for spectacles and the like, which method comprises wrapping a rod about a form to provide a series of elongated loops, pressing the sides of said loops together to form the bridges of spectacle frames, shaping the end portions of the loops into lens frames, severing said loops at the bridges and joining the respective ends of the loops to form lense frames.

6. The method of producing a plurality of complete frames for spectacles and the like, which method comprises permanently setting a continuous grooved rod into a plurality of frames integral with each other and severing the respective complete frames and cementing the grooved rod at the point of severance to form a plurality of complete frames.

7. The method of producing a plurality of frames for spectacles and the like, which method comprises forming a multiplicity of coils from a continuous rod of celluloid shaping said coils into a series of integral complete frames and severing said coils at the bridge of the frames to form a plurality of frames.

8. In a device of the class described, the combination of a frame having a pair of upright members thereon joined by a thin bridge and means for setting a rod coiled about said upright memers to cause it to conform thereto, thereby providing simultaneously a series of frames for spectacles.

9. In a device of the class described, the combination of a form having a pair of upright members thereon joined by an arched bridge, means for setting a rod coiled about said upright member to cause it to conform thereto, thereby providing a series of frames for spectacles, the bridge of the form forming the bridges of the frames, and lateral extensions diametrically disposed with respect to said bridge for forming loops to permit attachment of templets thereto.

10. In a device of the class described, the combination of a base member, a pair of upright cylindrical members thereon, said cylindrical members being spaced from each other, an arched bridge connecting said upright members, and laterally extending means on said cylindrical members substantially in line with the sides of said arched bridge.

Dated: New York, N. Y., December 19, 1927.

FRANK SPILL.